United States Patent
Katayanagi et al.

(10) Patent No.: US 6,991,480 B2
(45) Date of Patent: Jan. 31, 2006

(54) CARD CONNECTOR HAVING AN EJECT MECHANISM ADAPTABLE TO A PLURALITY OF KINDS OF CARDS DIFFERENT IN SIZE

(75) Inventors: Masayuki Katayanagi, Tokyo (JP); Kazushi Kamata, Aomori (JP)

(73) Assignees: Japan Aviation Electronics Industry, Limited, Tokyo (JP); JAE Hirosaki, Ltd., Aomori (JP)

( * ) Notice: Subject to any disclaimer, the term of this patent is extended or adjusted under 35 U.S.C. 154(b) by 0 days.

(21) Appl. No.: 11/012,563

(22) Filed: Dec. 15, 2004

(65) Prior Publication Data

US 2005/0136712 A1 Jun. 23, 2005

(30) Foreign Application Priority Data

Dec. 19, 2003 (JP) .............................. 2003-421816

(51) Int. Cl.
  *H01R 13/62* (2006.01)
(52) U.S. Cl. ........................................ 439/159; 439/64
(58) Field of Classification Search ......... 439/159–160
  See application file for complete search history.

(56) References Cited

U.S. PATENT DOCUMENTS

| | | | | |
|---|---|---|---|---|
| 5,655,918 A | * | 8/1997 | Soh .............................. | 439/159 |
| 5,836,775 A | * | 11/1998 | Hiyama et al. .............. | 439/159 |
| 5,907,354 A | * | 5/1999 | Cama et al. ............. | 348/231.7 |
| 6,059,589 A | * | 5/2000 | Nishioka .................... | 439/159 |
| 6,482,030 B1 | * | 11/2002 | Kuo ......................... | 439/541.5 |
| 6,540,523 B1 | * | 4/2003 | Kung et al. .................. | 439/64 |

FOREIGN PATENT DOCUMENTS

| | | |
|---|---|---|
| JP | 7192100 | 7/1995 |
| JP | 2003229207 | 8/2003 |

* cited by examiner

*Primary Examiner*—Truc Nguyen
(74) *Attorney, Agent, or Firm*—Collard & Roe, P.C.

(57) ABSTRACT

In a card connector to be connected to a card, a defining member defines an inserting region for receiving the card inserted in an inserting direction. The card connector includes an eject mechanism for ejecting the card from the inserting region in an ejecting direction opposite to the inserting direction. A plurality of ejecting members are adapted to be engaged with the card in the inserting region in the inserting and the ejecting directions and movable with respect to the defining member independently of one another. A linking mechanism selectively links the ejecting members to each other in response to insertion of the card in the inserting region.

16 Claims, 5 Drawing Sheets

CARD CONNECTOR HAVING AN EJECT MECHANISM ADAPTABLE TO A PLURALITY OF KINDS OF CARDS DIFFERENT IN SIZE

This application claims priority to prior Japanese patent application JP 2003-421816, the disclosure of which is incorporated herein by reference.

BACKGROUND OF THE INVENTION

This invention relates to a card connector having an eject mechanism for ejecting a card.

Recently, a plurality of kinds of cards different in size are used in various fields. Under the circumstances, there arises a demand for a card connector allowing those cards to be used in the same card connector. In this case, an eject mechanism for ejecting a card must be adaptable to such a plurality of kinds of cards. If a plurality of eject mechanisms are provided in correspondence to a plurality of kinds of cards, the card connector has a complicated structure which makes it difficult to reduce the size of the card connector. Further, in case where a card has a large width, it is desired that the eject mechanism uniformly applies an ejecting force to the card.

For example, Japanese Patent Application Publication (JP-A) No. 7-192100 (192100/1995) discloses a card connector having upper and lower receiving portions each of which receives a card. The card connector has an eject mechanism capable of independently eject each card.

However, the above-mentioned card connector is disadvantageous in the following respects. Since the card connector includes the upper and the lower receiving portions, the height of the card connector is inevitably increased. In addition, the card connector does not assume the use of a plurality of kinds of cards different in size.

Japanese Patent application Publication (JP-A) No. 2003-229207 (229207/2003) discloses another card connector having first and second card receiving portions arranged adjacent to each other in a widthwise direction. The card connector has first and second card ejecting members for ejecting first and second cards, respectively. The first card receiving portion is shorter in depth than the second card receiving portion. Behind the first card receiving portion, at least one of the first and the second card ejecting members is disposed.

The above-mentioned card connector allows two cards to be accommodated in the first and the second card receiving portions, respectively. However, the connector is not designed so as to use a single large card having a width corresponding to that of the two cards arranged in the widthwise direction.

SUMMARY OF THE INVENTION

It is therefore an object of this invention to provide a card connector which allows a plurality of kinds of cards different in size to be selectively used and which removes a problem associated with an ejecting operation.

It is another object of this invention to provide a card connector which is capable of reliably ejecting a desired one of a plurality of cards simultaneously received in the card connector.

Other objects of the present invention will become clear as the description proceeds.

According to an aspect of this invention, there is provided a card connector to be connected to a card, the connector comprising a defining member for defining an inserting region for receiving the card inserted in an inserting direction and an eject mechanism for ejecting the card from the inserting region in an ejecting direction opposite to the inserting direction, the eject mechanism comprising a plurality of ejecting members adapted to be engaged with the card in the inserting region in the inserting and the ejecting directions and movable with respect to the defining member independently of one another and a linking mechanism to be coupled to the defining member to selectively link the ejecting members to each other in response to insertion of the card in the inserting region.

DESCRIPTION OF THE PREFERRED EMBODIMENT

Figure 1:
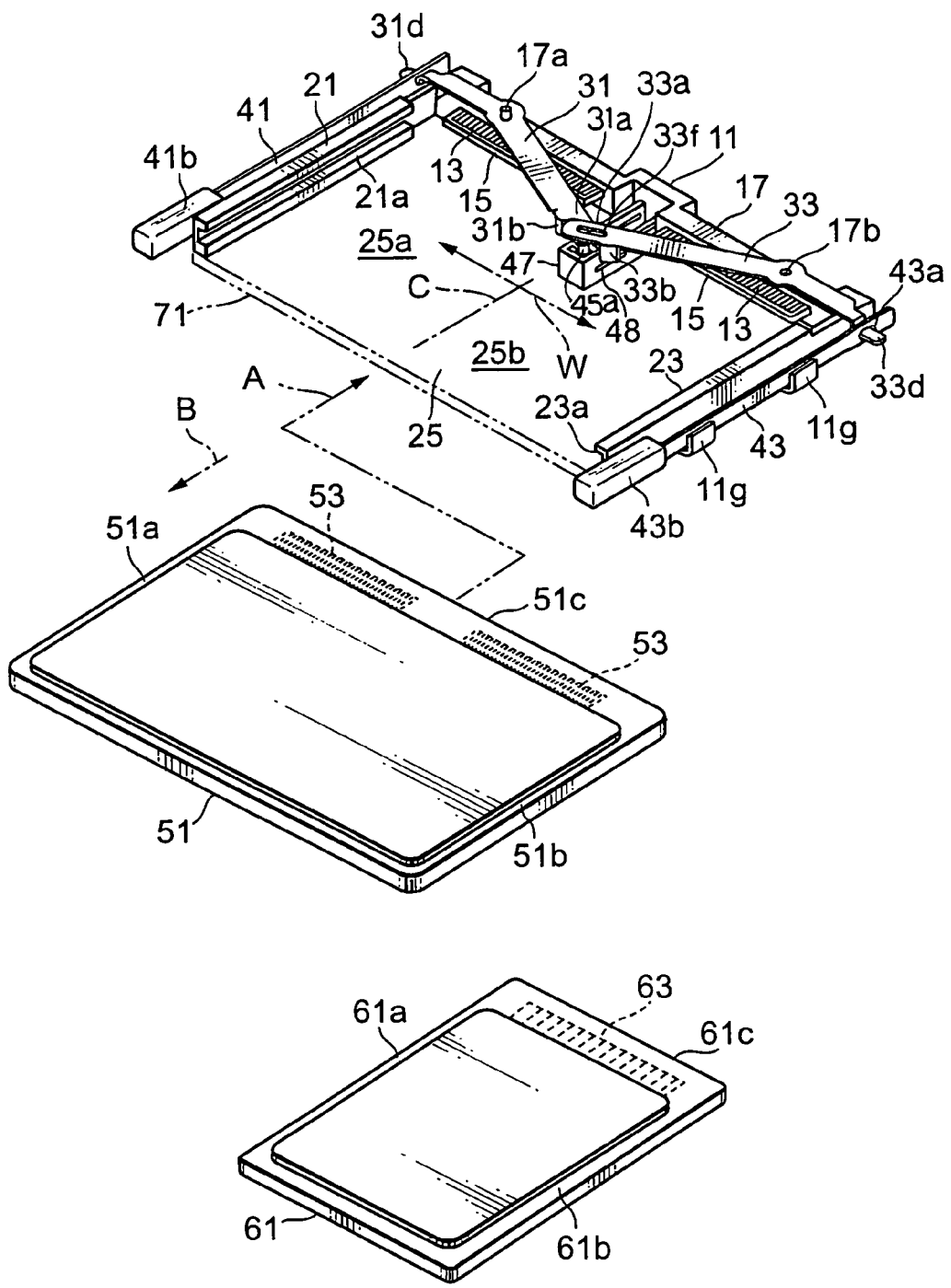
FIG. 1 is a perspective view of a card connector according to an embodiment of this invention together with two different cards to be connected to the card connector.
Figure 2:
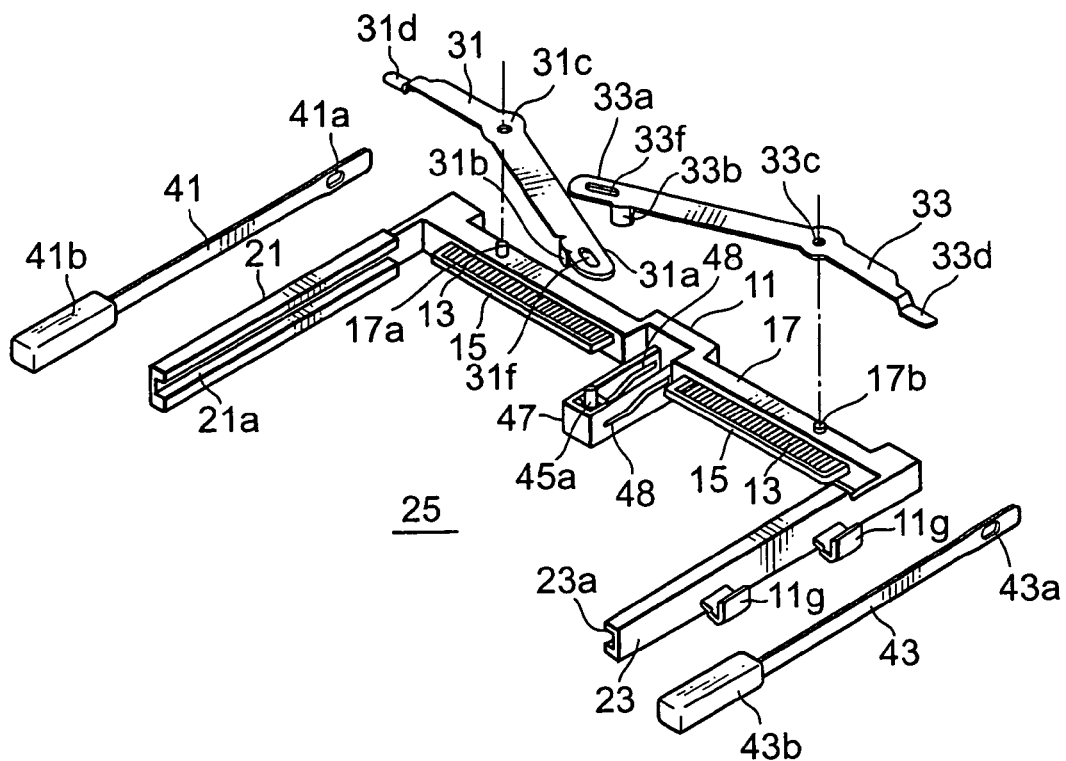
FIG. 2 is an exploded perspective view of the card connector illustrated in FIG. 1.

Referring to FIGS. 1 and 2, description will be made of a card connector according to an embodiment of this invention.

The card connector illustrated in the figure serves to connect an IC card used in an electronic apparatus. By the use of the card connector, it is possible to selectively connect a wide IC card (hereinafter called a first card 51) and a narrow IC card (hereinafter called a second card 61). Thus, the card connector is capable of connecting only one card which may be the first card 51 or the second card 61 and of simultaneously connecting two second cards 61. In the present specification, the first card 51 and the second card 61 may collectively and simply be called a card.

The card connector comprises a defining member, i.e., a generally U-shaped insulator 11 defining an insertion region for inserting the card, a plurality of conductive contacts 13 fixed to the insulator 11, and an eject mechanism for ejecting the card from the insertion region. The card is inserted in an inserting direction A and ejected in an ejecting direction B opposite to the inserting direction A. A direction perpendicular to the inserting and the ejecting directions A and B will be called a widthwise direction W. A direction perpendicular to the inserting direction A and the widthwise direction W will be called a thickness direction.

The insulator 11 has a connector portion 15 provided with the contacts 13, a bridge portion 17 including the connector portion 15, and a pair of frame portions 21 and 23 having one ends connected to opposite ends of the bridge portion 17 in the widthwise direction W, respectively. The frame portions 21 and 23 are faced to each other in the widthwise direction W.

The frame portions 21 and 23 are provided with a pair of guide grooves 21a and 23a formed on confronting surfaces thereof, respectively. The first card 51 is inserted into the guide grooves 21a and 23a. Specifically, the first card 51 has opposite sides 51a and 51b perpendicular to the widthwise direction W. The sides 51a and 51b are inserted into the guide grooves 21a and 23a, respectively. The first card 51 is guided by the guide grooves 21a and 23a.

Alternatively, the second card 61 is inserted into the guide groove 21a or 23a. The second card 61 has opposite sides 61a and 61b perpendicular to the widthwise direction W. One of the sides 61a and 61b is inserted into the guide groove 21a or 23a. The second card 61 is guided by the guide groove 21a or 23a.

The first card 51 is provided with a plurality of mating contacts 53 to be contacted with the contacts 13 in one-to-one correspondence. The mating contacts 53 are formed on a back surface of the first card 51 at its forward end in the inserting direction A. Similarly, the second card 61 is provided with a plurality of mating contacts 63 to be contacted with the contacts 13 in one-to-one correspondence. The mating contacts 63 are formed on a back surface of the second card 61 at its forward end in the inserting direction A.

In the connector portion 15, the contacts 13 are disposed in parallel to one another at a predetermined interval in the widthwise direction W. The insulator 11 is adapted to receive the first card 51, the second card 61, or the two second cards 61 inserted in the inserting direction A to a predetermined card position. When the first card 51 or the second card 61 is received in the predetermined card position, the mating contacts 53 or 63 are connected to the contacts 13 in the connector portion 15. Thus, the contacts 13 are connected to the mating contacts 53 or 63 when the first card 51 or the second card 61 is inserted to the predetermined card position.

The eject mechanism serves to move the first card 51 or the second card 61 in the ejecting direction B opposite to the inserting direction A so as to eject the card from the predetermined card position.

Further, the card connector will be described more in detail. The insulator 11 has a receiving portion 25 for receiving the first or the second card 51 or 61. The receiving portion 25 is a part surrounded by the insulator 11, i.e., by the bridge portion 17 including the connector portion 15 and the frame portions 21 and 23.

The receiving portion 25 receives the first card 51 having a size corresponding to an entire width of the receiving portion 25 in the widthwise direction W.

Further, the receiving portion 25 has two predetermined sections 25a and 25b formed by segmenting the receiving portion 25 to receive the second card 61 alone or two second cards 61 in parallel.

The eject mechanism comprises a pair of ejecting members or eject plates 31 and 33, and a pair of eject bars 41 and 43 engaged with the eject plates 31 and 33, respectively. When the eject mechanism is operated in a condition where the first card 51 is inserted, at least one of the eject plates 31 and 33 is brought into contact with a front end face 51c of the first card 51 in the inserting direction A. When the second card 61 is inserted, one of the eject plates 31 and 33 is brought into contact with a front end face 61c of the second card 61 in the inserting direction A. When the two second cards 61 are inserted, the eject plates 31 and 33 are brought into contact with the front end faces 61C of the second cards 61 in one-to-one correspondence. The eject plates 31 and 33 are rotated by the eject bars 41 and 43, respectively.

The eject plates 31 and 33 are located in one-to-one correspondence to the predetermined sections 25a and 25b so as to move the two second cards 61 in the ejecting direction B.

The eject plate 31 has a linking portion 31a at one end thereof, a pressing portion 31b to be brought into contact with the first card 51 or the second card 61, a shaft hole 31c formed at an intermediate portion in its longitudinal direction, and a plate engaging portion 31d formed at the other end. Similarly, the eject plate 33 has a linking portion 33a at one end thereof, a pressing portion 33b to be brought into contact with the first card 51 or the second card 61, a shaft hole 33c formed at an intermediate portion in the longitudinal direction, and a plate engaging portion 33d formed at the other end.

The pressing portions 31b and 33b are located in the vicinity of the linking portion 31a and 33b, respectively. The pressing portions 31b and 33b are brought into contact with the front end face 51c or 61c of the first or the second card 51 or 61 when the first or the second card 51 is inserted to the depth of the receiving portion 25 so as to reach the predetermined card position. Each of the pressing portions 31b and 33b is formed by bending a part of each of the eject plates 31 and 33 towards the receiving portion 25, i.e., downward.

The bridge portion 17 of the insulator 11 is provided with a pair of shaft portions 17a and 17b formed on its upper surface to rotatably support the eject plates 31 and 33, respectively. The shaft portions 17a and 17b are fitted into the shaft holes 31c and 33c of the eject plates 31 and 33, respectively, so that the eject plates 31 and 33 are rotatable around the shaft portions 17a and 17b, respectively. Thus, the shaft portions 17a and 17b pivotally supports the eject plates 31 and 33 so that the eject plates 31 and 33 are rotatable between a normal position above the receiving portion 25 and a predetermined plate position corresponding to the predetermined card position.

The linking portions 31a and 33a of the eject plates 31 and 33 generally overlap with each other and are movable in the inserting and the ejecting directions A and B between the normal position above the receiving portion 25 and the predetermined plate position along a center line C separating the receiving portion 25 into the predetermined sections 25a and 25b in the widthwise direction W.

The linking portions 31a and 33a are provided with linking holes 31f and 33f, respectively. Each of the linking holes 31f and 33f has a long dimension accommodating a path of intersection of the rotation of the eject plates 31 and 33 and the center line C of the receiving portion 25.

The eject bars 41 and 43 are located outside of the frame portions 21 and 23 and extend along the frame portions 21 and 23, respectively. The eject bars 41 and 43 are movable along the frame portions 21 and 23 in the inserting and the ejecting directions A and B, respectively. The eject bars 41 and 43 are supported by a plurality of supporting portions 11g formed on outer surfaces of the frame portions 21 and 23, respectively.

The eject bars 41 and 43 have bar engaging holes 41a and 43a formed at their forward ends in the inserting direction A, respectively. The bar engaging holes 41a and 43a receive the plate engaging portions 31d and 33d of the eject plates 31 and 33, respectively, to be engaged therewith. The eject bars 41 and 43 have eject buttons 41b and 43b fixed to their forward ends in the ejecting direction B, respectively.

The insulator 11 is provided with a linking mechanism located between the predetermined sections 25a and 25b and extending from the bridge portion 17 to the receiving portion 25 in the ejecting direction B.

Figure 3:
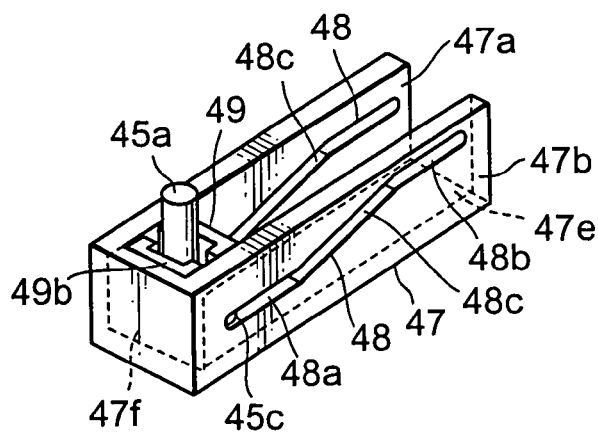
FIG. 3 is an enlarged perspective view of a linking mechanism of the card connector illustrated in FIG. 1 when it is in an initial position.
Figure 4:
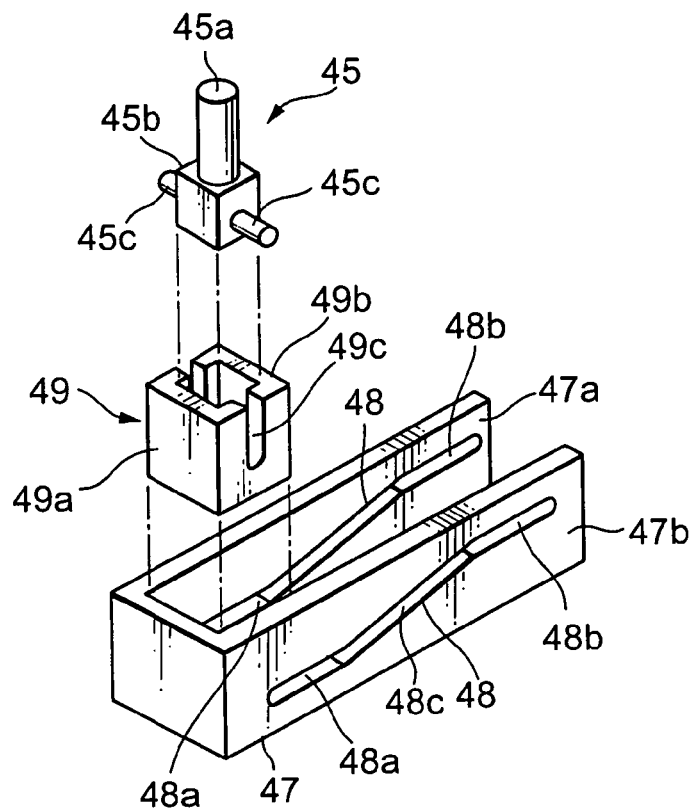
FIG. 4 is an exploded perspective view of the linking mechanism illustrated in FIG. 3.

As shown in FIGS. 3 and 4 in an enlarged scale, the linking mechanism comprises a linking member 45, a slider receiving member 47 allowing the linking member 45 to slide in the inserting and the ejecting directions A and B and simultaneously move in a vertical direction, and a slider member 49 having a generally rectangular body and movable in the inserting and the ejecting directions A and B.

The linking member 45 is brought into contact with the front end face 51c of the first card 51 when the first card 51 is inserted. The linking member 45 connects the linking portions 31a and 33b of the eject plates 31 and 33 to each other when the linking portions 31a and 33a are moved to a predetermined linking position corresponding to the predetermined card position.

At an initial position where the first or the second card 51 or 61 is not received in the receiving portion 25, the linking member 45 is located below the linking portions 31a and 33a. The linking member 45 has a linking pin 45a to be engaged with the linking holes 31f and 33f when the linking member 45 is elevated at the predetermined linking position, and a pin holding portion 45b having a rectangular body and supporting the linking pin 45a standing up therefrom.

The pin holding portion 45b is provided with a pair of cylindrical protrusions 45c protruding in the widthwise direction W. The linking pin 45a is disposed on the center line C in FIG. 1. The second card 61 is movable in the inserting and the ejecting directions A and B between the linking pin 45a and the frame portion 21 or 23. At the initial position, the linking pin 45a is located below the linking portions 31a and 33a. In case where the two second cards 61 are received in parallel in the predetermined sections 25a and 25b of the receiving portion 25, the linking pin 45a is located between the two second cards 61.

The linking pin 45a is movable in the inserting and the ejecting directions A and B on the center line C of the receiving portion C. When the linking pin 45a moves in the inserting direction A, the linking pin 45a protrudes upward. When the linking pin 45a is located at the initial position (i.e., a low position), the linking pin 45 does not interfere with the eject plates 31 and 33. When the linking pin 45a moves in the inserting direction A, the linking pin 45a is engaged with the linking holes 31f and 33f of the linking portions 31a and 33a of the eject plates 31 and 33.

The slider receiving member 47 is formed integral with the bridge portion 17 of the insulator 11. The pin holding portion 45b is coupled to the slider receiving member 47 via the sliding member 49 that is slidable along the slider receiving member 47 in the inserting and the ejecting directions A and B without being moved in the vertical direction. Therefore, only the linking member 45 moves in the vertical direction while moving in the inserting and the ejecting directions A and B. Consequently, the linking pin 45a moves in the vertical direction together with the pin holding portion 45b.

More particularly, the slider receiving member 47 has a pair of wall portions 47a and 47b parallel to the inserting and the ejecting directions A and B and to the vertical direction. Between the wall portions 47a and 47b, the pin holding portion 45b and the sliding member 49 are fitted. Each of the wall portions 47a and 47b is provided with a guide portion 48 having a stepped structure descending in the ejecting direction B and ascending in the inserting direction A. In addition to the wall portions 47a and 47b, the slider receiving member 47 has a bottom portion 47e and a stopper wall portion 47f closing an opening between the wall portions 47a and 47b in the ejecting direction B. Another opening in the inserting direction A is closed by the bridge portion 17 of the insulator 11. In the slider receiving member 47, downward movement of the sliding member 49 is restricted by the bottom portion 47e. In the slider receiving member 47, movement of the sliding member 49 in the ejecting and the inserting directions B and A are restricted by the stopper wall portion 47f and the bridge portion 17. Each of the guide portions 48 is a guiding long hole formed in each of the wall portions 47a and 47b so that the protruding portions 45c of the pin holding portion 45b are slidably engaged. The protruding portions 45c of the pin holding portion 45b protrude outward and are inserted into the guide portions 48 to be slidable in the ejecting and the inserting directions B and A. The guide portion 48 has an ejecting end 48a and an inserting end 48b in the ejecting direction B and the inserting direction A, respectively. The ejecting end 48a and the inserting end 48b are parallel to the ejecting and the inserting directions B and A. The ejecting end 48a at a low level and the inserting end 48b at a high level are connected to each other by an inclined intermediate portion 48c. The sliding member 49 has a tubular portion 49a receiving the pin holding portion 45b so that the pin holding portion 45b is movable up and down, and a pair of cut portions 49c extending downward from an upper end face 49b of the sliding member 49. The cut portions 49c receive the protruding portions 45c to allow vertical movement of the protruding portions 45c and the pin holding portion 45b. Thus, the protruding portions 45c play in the cut portions 49c of the sliding member 49.

Next referring to FIGS. 1, 6, and 7, description will be made of an operation of inserting the first card 51 as a wide card into the receiving portion 25 of the card connector until the first card 51 is received in the predetermined card position, together with operations of the eject mechanism and the linking mechanism.

Figure 6:
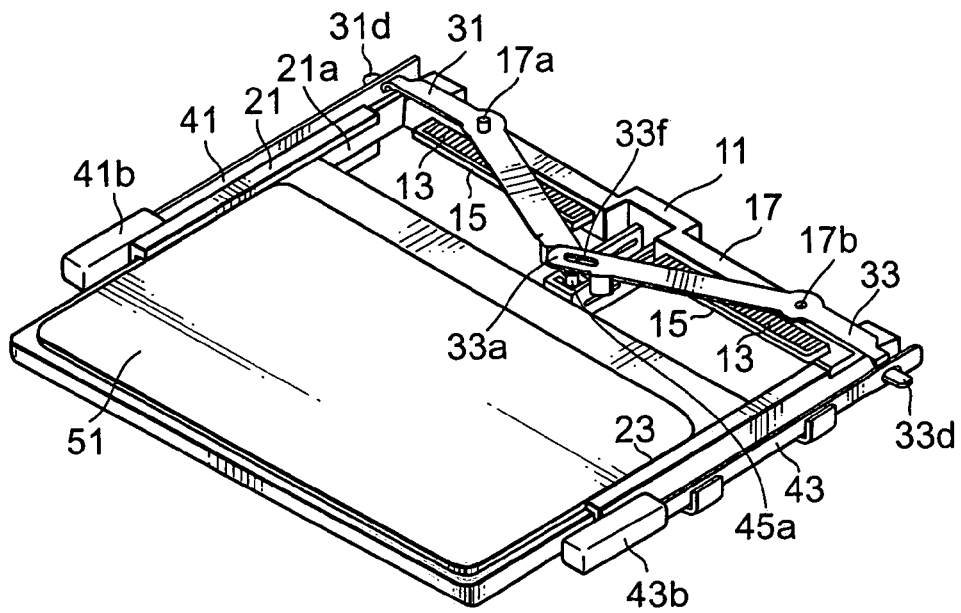
FIG. 6 is a perspective view of the card connector in FIG. 1 at an initial stage of insertion of a wide card.

In order to insert the first card 51 into the receiving portion 25, the first card 51 at an uninserted position in FIG. 1 (i.e., a position where the first card 51 is not inserted into the receiving portion 25) is inserted into the receiving portion 25 in the inserting direction A as shown in FIG. 6. The first card 51 is further inserted along the guide grooves 21a and 23a of the frame portions 21 and 23 to be brought into contact with the linking pin 45a on the center line C of the receiving portion 25. Then, the end face 51c of the first card 51 is brought into contact with the pressing portions 31b and 33b of the eject plates 31 and 33 to press the eject plates 31 and 33 in the inserting direction A. The eject plates 31 and 33 are rotated around the shaft portions 17a and 17b to move to the predetermined plate position. Simultaneously, the linking pin 45a is pressed by the end face 51c of the first card 51 to move to the predetermined linking position as will later be described.

Figure 7:
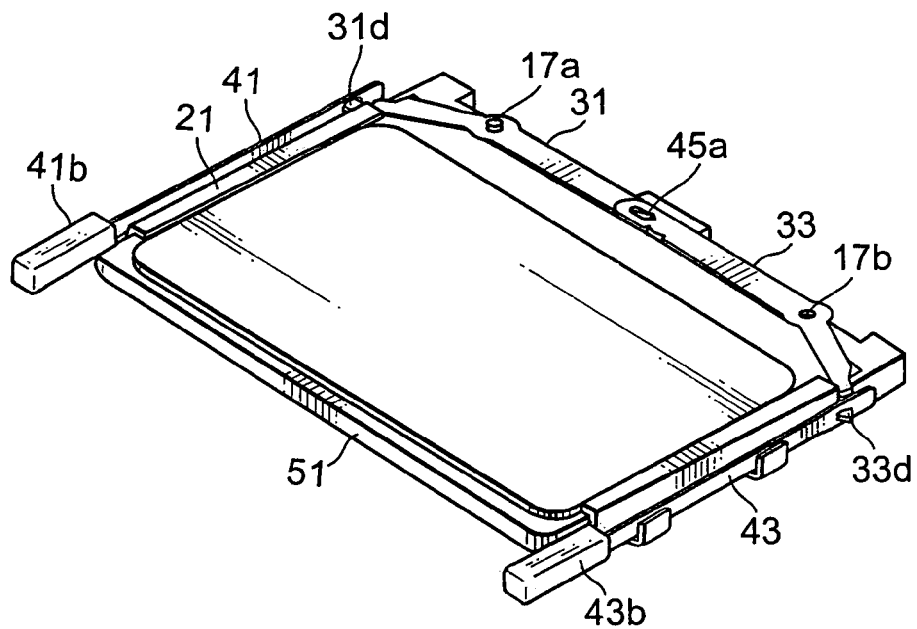
FIG. 7 is a perspective view similar to FIG. 6 when the wide card is received in a predetermined card position.

As shown in FIG. 7, when the eject plates 31 and 33 reach the predetermined plate position, the mating contacts 53 of the first card 51 are connected to the contacts 13. When the eject plates 31 and 33 are rotated, the eject bars 41 and 43 move in the ejecting direction B and the eject buttons 41b and 43b protrude in the ejecting direction B as compared with an initial position illustrated in FIG. 6.

Figure 5:
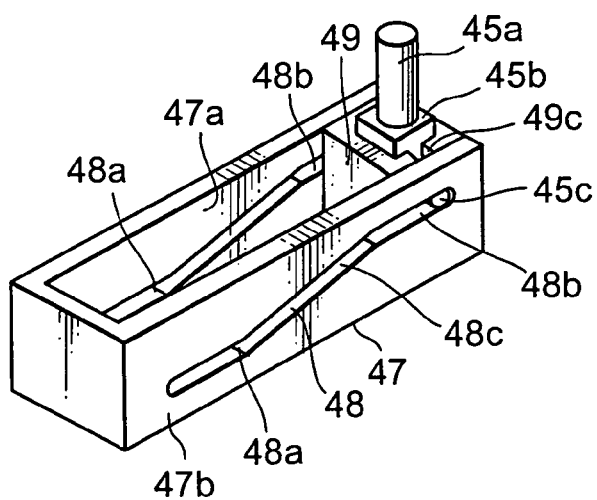
FIG. 5 is a perspective view showing the linking mechanism illustrated in FIG. 3 when it is in a linking position.

In the linking mechanism, the protruding portions 45c of the pin holding portion 45b are inserted into the guide portions 48 of the slider receiving member 47. When no card is inserted, the linking pin 45*a* is located at the initial position illustrated in FIG. 3. As the first card 51 is pressed forward in the inserting direction A, the linking pin 45*a* and the sliding member 49 also moves in the inserting direction A. Following the movement of the linking pin 45*a* in the inserting direction A, the protruding portions 45*c* slide along the guide portions 48 of the slider receiving member 47. When the first card 51 reaches the predetermined card position, the linking pin 45*a* reaches the linking position illustrated in FIG. 5 where the linking pin 45*a* is engaged with the linking holes 31*f* and 33*f* of the linking portions 31*a* and 33*a* to couple the linking portions 31*a* and 33*a* to each other.

Specifically, following the movement of the linking pin 45*a* in the inserting direction A, the protruding portions 45*c* of the pin holding portion 45*b* move in the guide portions 48 from the ejecting ends 48*a* to the intermediate portions 48*c*. Along the inclination of the intermediate portions 48*c*, the protruding portions 45*c* gradually move upward in the guide portions 48 and in the cut portions 49*c* of the sliding member 49. Therefore, the linking pin 45*a* moves upward together with the pin holding portion 45*b*. Thus, the linking pin 45*a* gradually rises up as it moves in the inserting direction A. Thereafter, the protruding portions 45*c* move upward in the guide portions 48 to the inserting ends 48*b* so that the linking pin 45*a* is engaged with the linking holes 31*f* and 33*f* to link the linking portions 31*a* and 33*a* to each other.

In the linking mechanism having the above-mentioned structure, when the linking pin 45*a* is applied with a force in the inserting direction A, the linking pin 45*a* moves forward in the inserting direction A and is displaced upward because the protruding portions 45*c* move upward in the guide portions 48. Since the linking pin 45*a* is forced to move only vertically in the tubular portion 49*a* of the sliding member 49, the linking pin 45*a* is reliably operated without being inclined.

In order to eject the first card 51 from the predetermined card position in the receiving portion 25, one of the eject buttons 41*b* and 43*b* is pressed in the inserting direction A. In this event, the linking portions 31*a* and 33*a* of the eject plates 31 and 33 connected by the linking pin 45*a* are rotated in the ejecting direction B to return from the predetermined linking position to the initial position. Simultaneously, the linking pin 45*a* returns from the predetermined linking position illustrated in FIG. 5 to the initial position illustrated in FIG. 3. The linking pin 45*a* moves in the ejecting direction B together with the linking portions 31*a* and 33*a* and is disengaged from the linking portions 31*a* and 33*a* at the initial position.

Thus, the first card 51 is received in the state where the linking portions 31*a* and 33*a* of the eject plates 31 and 33 are linked to each other by the linking pin 45*a*. Therefore, by operating either one of the eject buttons 41*b* and 43*b* of the eject bars 41 and 43 connected to each other, the first card 51 can be ejected without fail and taken out from the receiving portion 25.

In this event, the pressing portions 31*b* and 33*b* of the eject plates 31 and 33 push two different points of the first card 51, respectively. Therefore, the ejecting force is evenly applied to the first card 51. This results in smooth ejection of the first card 51.

As illustrated in FIG. 1, the card connector is generally fixed on a board 71, such as a printed circuit board. The receiving portion 25 may be covered at its top with a cover member (not shown). Therefore, it may be difficult to visually confirm which one of the first card 51 and the second card 61 is received in the receiving portion 25.

In case where the card connector is covered with the cover member, the cover member is provided with an opening formed at least in an area where the linking portions 31*a* and 33*a* are linked by the linking pin 45*a*.

Via the opening, an end portion of the linking pin 45*a* can be visually observed through the linking holes 31*f* and 33*f*. In this case, i.e., if the end portion of the linking in 45*a* is seen, it is confirmed that the first card 51 is received in the receiving portion 25 and that the second card 61 is not received in the receiving portion 25.

Next referring to FIGS. 1, 8, and 9, description will be made of an operation of inserting the second card 61 into the receiving portion 25 of the card connector until the second card 61 is received in the predetermined position, together with an operation of the eject mechanism.

The second card 61 at an uninserted position in FIG. 1 is inserted into the predetermined section 25*a* of the receiving portion 25. At this time, the second card 61 is inserted along the guide groove 21*a* of the frame 21.

When insertion of the second card 61 proceeds, the one side 61*b* of the second card 61 perpendicular to the width-wise direction W is brought into contact with the linking pin 45*a* on the center line C of the receiving portion 25. The back surface of the second card 61 adjacent to the one side 61*b* slides on an upper surface of the one wall portion 47*a* of the slider receiving member 47.

The end face 61*c* of the second card 61 is brought into contact with the pressing portion 31*b* of the one eject plate 31 to press the eject plate 31 in the inserting direction A so that the eject plate 31 is rotated around the shaft portion 17*a* to move to the predetermined plate position.

Figure 8:
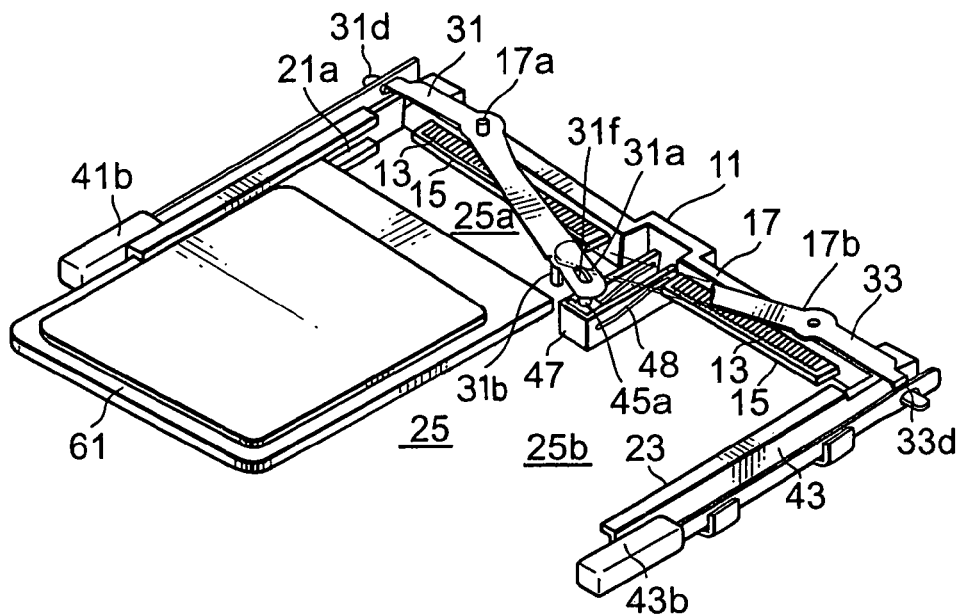
FIG. 8 is a perspective view of the card connector in FIG. 1 at an initial stage of insertion of a narrow card.
Figure 9:
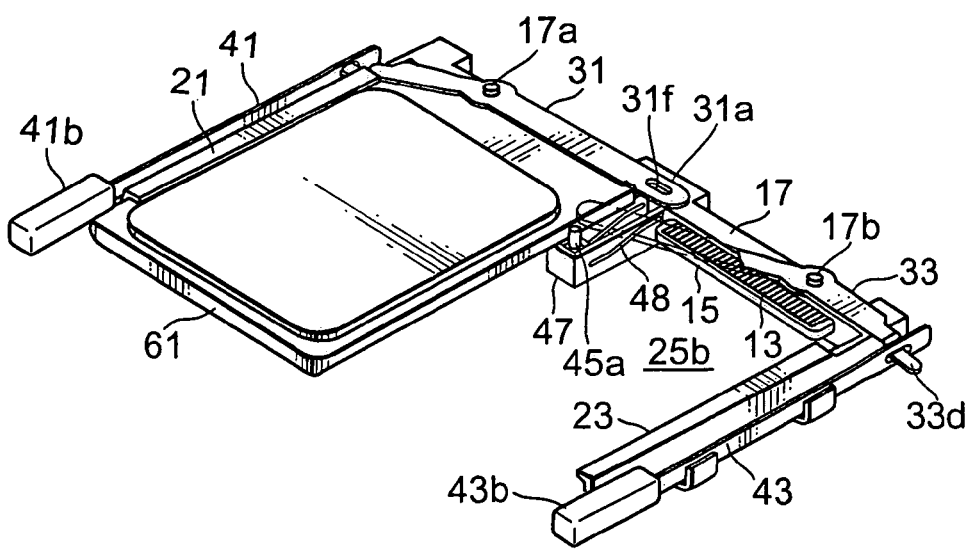
FIG. 9 is a perspective view similar to FIG. 8 when the narrow card is received in a predetermined card position.

In FIGS. 8 and 9, an end portion of the linking portion 33*a* of the other eject plate 33 is omitted in order to facilitate an understanding of the following description.

As illustrated in FIG. 9, the eject plate 31 is rotated in the inserting direction A as the second card 61 is pressed in the inserting direction A. When the second card 61 reaches the predetermined card position, the eject plate 31 also moves to the predetermined plate position. Thus, the second card 61 is received in the predetermined section 25*a* of the receiving portion 25.

When the eject plate 31 is rotated to reach the predetermined plate position, the mating contacts 63 of the second card 61 are connected to the contacts 13. When the eject plate 31 is rotated, the eject bar 41 moves in the ejecting direction B so that the eject button 41*b* protrudes in the ejecting direction B as compared with an initial position illustrated in FIG. 8.

In order to eject the second card 61 from the predetermined card position in the receiving portion 25, the eject button 41*b* is pressed in the inserting direction A to rotate the linking portion 31*a* of the eject plate 31 in the ejecting direction B. When the eject plate 31 is returned from the predetermined plate position to the initial position, the second card 61 is ejected.

Thus, by pressing the eject button 41*b* of the eject bar 41 in the inserting direction A, the eject plate 31 is rotated towards the receiving portion 25 in the ejecting direction B so that the end face 61*c* of the second card 61 is pressed by the pressing portion 31*b*. Then, the second card 61 received in the receiving portion 25 is moved in the ejecting direction B.

The foregoing description also applies to a case where the second card 61 is inserted into the predetermined section 25*b* of the receiving portion 25. Since each of the eject plates 31 and 33 is solely and independently operable as described above, the second card 61 received in either one of the predetermined sections 25a and 25b can be ejected by operating a corresponding one of the eject buttons 41b and 43b.

In case where the two second cards 61 are inserted into the predetermined sections 25a and 25b of the receiving portion 25, the eject plates 31 and 33 are not linked to each other. Therefore, the eject plates 31 and 33 are operable independent of each other.

Each of the guide portions 48 may be a rib portion formed on each of the confronting surfaces of the wall portions 47a and 47b so that the protruding portion 45c of the pin holding portion 45b is slidably engaged. The guide portion 48 may be a long groove formed on each of he confronting surfaces of the wall portions 47a and 47b.

The linking mechanism may have any other appropriate structure than that mentioned above as far as upward displacement of the linking pin 45a is achieved following the movement in the inserting direction A.

The card connector according to this invention at least has a pair of eject mechanisms independent of each other. When the second card is inserted, the eject mechanisms are independently operable. When the first card is inserted, the eject mechanisms are operable in association with each other by the linking mechanism. Thus, a desired one of the first card and the second card or cards can be reliably ejected.

By providing the linking mechanism with a mechanism for identifying the first card (wide card) and the second card (narrow card), it is possible to prevent the card from being erroneously ejected.

The card connector according to this invention is applicable not only to an IC card connector but also to a card connector incorporated into various electronic apparatuses such as a notebook-type personal computer using a SD card, a memory card, or a PC card and a mobile terminal such as a PDA and a mobile telephone.

While this invention has thus far been described in connection with the preferred embodiment thereof, it will be readily possible for those skilled in the art to put this invention into practice in various other manners without departing from the scope set forth in the appended claims.

What is claimed is:

1. A card connector to be connected to a card, the connector comprising:
   a defining member for defining an inserting region for receiving the card inserted in an inserting direction; and
   an eject mechanism for ejecting the card from the inserting region in an ejecting direction opposite to the inserting direction,
   the eject mechanism comprising:
   a plurality of ejecting members adapted to be engaged with the card in the inserting region in the inserting and the ejecting directions and movable with respect to the defining member independently of one another; and
   a linking mechanism to be coupled to the defining member to selectively link the ejecting members to each other in response to insertion of the card in the inserting region.

2. The card connector according to claim 1, further comprising:
   an insulator connected to the defining member; and
   a conductive contact held by the insulator and adapted to be contacted with the card in the inserting region.

3. The card connector according to claim 1, wherein the inserting region has a size corresponding to a first card used as the card, the inserting region being segmented into a plurality of sections in a widthwise direction perpendicular to the inserting direction, each of the sections having a size corresponding to a second card used as the card.

4. The card connector according to claim 3, wherein the ejecting members are provided in one-to-one correspondence to the sections.

5. The card connector according to claim 4, wherein the linking mechanism includes a linking member disposed between adjacent ones of the sections and movable in the inserting and the ejecting directions, the linking member linking adjacent ones of the ejecting members when the linking member moves in the inserting direction.

6. The card connector according to claim 5, wherein the linking mechanism includes a guide member for guiding movement of the linking member, the guide member making the linking member move in a thickness direction perpendicular to the inserting and the widthwise directions following the movement of the linking member in the inserting direction, thereby engaging the linking member with the adjacent ones of the ejecting members.

7. The card connector according to claim 6, wherein each of the adjacent ones of the ejecting members has a linking hole faced to the linking member in the thickness direction, the linking member being inserted into the linking hole following the movement of the linking member in the inserting direction.

8. The card connector according to claim 7, wherein each of the eject members is rotatably connected to the defining member, the linking hole being formed at a rotating end of each of the ejecting members.

9. The card connector according to claim 6, wherein the linking mechanism includes a holding portion holding the linking member and coupled with the guide member to be slidable in the inserting and the thickness directions.

10. The card connector according to claim 9, wherein the holding portion has a protruding portion protruding in the widthwise direction, the guide member being engaged with the protruding portion to move the linking member in the thickness direction following the movement of the linking member in the inserting and the ejecting directions.

11. The card connector according to claim 10, wherein the guide member has a pair of wall portions extending in the inserting and the thickness directions, the holding portion being disposed between the wall portions, each of the wall portions having a guide portion extending in the inserting direction with a step formed in the middle thereof, the protruding portion being engaged with the guide portion.

12. The card connector according to claim 11, wherein the guide portion has an ejecting end and an inserting end parallel to the ejecting and the inserting directions, the ejecting end and the inserting end being connected to each other by an inclined intermediate portion.

13. The card connector according to claim 11, wherein the guide portion is a groove, the protruding portion being inserted into the groove.

14. The card connector according to claim 11, wherein the linking mechanism includes a sliding member holding the holding portion so that the holding portion is movable in the thickness direction, the sliding member being disposed between the wall portions to be slidable in the inserting and the ejecting directions.

15. The card connector according to claim 4, wherein the ejecting members have pressing portions placed in the sections, respectively, the pressing portions being directed in the ejecting direction opposite to the inserting direction.

16. The card connector according to claim 1, wherein the defining member comprises:

a pair of frame portions extending in the inserting direction to define the inserting region therebetween, the frame portions being for guiding insertion of the card; and a bridge portion extending between one ends of the frame portions in the inserting direction;

the ejecting members and the linking mechanism being connected to the bridge portion.

* * * * *